US007571558B2

(12) United States Patent
Horii

(10) Patent No.: US 7,571,558 B2
(45) Date of Patent: Aug. 11, 2009

(54) BACKHOE HYDRAULIC SYSTEM

(75) Inventor: Hiroshi Horii, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/203,323

(22) Filed: Sep. 3, 2008

(65) Prior Publication Data

US 2009/0077839 A1 Mar. 26, 2009

(30) Foreign Application Priority Data

Sep. 25, 2007 (JP) ............................ 2007-247489

(51) Int. Cl.
*E02F 5/02* (2006.01)
*F16D 31/02* (2006.01)

(52) U.S. Cl. .......................................... 37/348; 60/421

(58) Field of Classification Search .................. 37/348, 37/382; 60/420–422, 494, 428, 429; 90/512, 90/516, 532, 534
See application file for complete search history.

(56) References Cited

U.S. PATENT DOCUMENTS

| | | | | |
|---|---|---|---|---|
| 6,029,445 | A * | 2/2000 | Lech | 60/422 |
| 6,173,573 | B1 * | 1/2001 | Kamada | 60/422 |
| 6,502,499 | B2 * | 1/2003 | Sannomiya et al. | 91/436 |
| 6,584,770 | B2 * | 7/2003 | Tsuruga et al. | 60/422 |
| 7,069,674 | B2 * | 7/2006 | Arii | 37/348 |
| 7,412,826 | B2 * | 8/2008 | Horii | 60/421 |

FOREIGN PATENT DOCUMENTS

JP 2006-161510 6/2006

* cited by examiner

*Primary Examiner*—Robert E Pezzuto
(74) *Attorney, Agent, or Firm*—The Webb Law Firm

(57) ABSTRACT

A pilot pressure control valve V17 is provided that is switchable between an operation position 56 where pilot pressure is supplied to a first channel switching valve V12 and a non-operation position 57 where pilot pressure is not supplied to the first channel switching valve V12; this pilot pressure control valve V17 is switched to the non-operation position 57 during a state of non-travel and is switched to the operation position 56 with a pilot pressure established in a travel detection circuit 54, and in the operation position 56, supplies a pilot source pressure to the first channel switching valve V12 from a fourth pump P4 on the upstream side of a pressurized oil introduction orifice 53.

2 Claims, 4 Drawing Sheets

BACKHOE HYDRAULIC SYSTEM

BACKGROUND OF THE INVENTION

1. Field of the Invention

The present invention relates to a hydraulic system of a backhoe in which a swiveling base provided with a ground work apparatus is mounted so as to be capable of swiveling around a vertical axis on a traveling body.

2. Description of the Related Art

JP 2006-161510A discloses a hydraulic system of a backhoe in which a swiveling base provided with a hydraulically-driven ground work apparatus is mounted so as to be capable of swiveling around a vertical axis on a traveling body provided with a hydraulically-driven left-right pair of travel apparatuses. In this backhoe hydraulic system, during a state of non-travel, pressurized oil from a first pump and a second pump merges together and is supplied to the ground work apparatus, and pressurized oil from a third pump is supplied to a swiveling motor that allows the swiveling base to swivel. During travel, pressurized oil from the first pump is supplied to one of the left and right travel apparatuses, and pressurized oil from the second pump is supplied to the other of the left and right travel apparatuses, so that pressurized oil from the first pump and pressurized oil from the second pump is supplied independently, and pressurized oil from the third pump is supplied to a hydraulic actuator of the ground work apparatus.

In this conventional hydraulic system, a first channel switching valve and a second channel switching valve are provided. The first channel switching valve is switchable between a merging position where pressurized oil from the first pump and the second pump merges together and is supplied to a ground work apparatus control valve, and an independent supply position where pressurized oil from the first pump and the second pump is respectively independently supplied to a control valve for the left and right travel apparatuses. The second channel switching valve is switchable between a non-supply position where pressurized oil from the third pump is not supplied to the ground work apparatus control valve, and a supply position where pressurized oil from the third pump is supplied to the ground work apparatus control valve. Also, in this conventional hydraulic system, a travel detection circuit is provided that is in communication with a discharge oil path of a fourth pump via an orifice for introducing pressurized oil, and detects that the travel apparatus control valve has been operated. The travel detection circuit is configured to detect that the travel apparatus control valve has been operated when pressure is established in the circuit due to part of the circuit being blocked when the travel apparatus control valve has been operated.

The first channel switching valve and the second channel switching valve are configured with a pilot operation switching valve that is switched by a pilot pressure. With these valves, pilot pressure established in the travel detection circuit when the travel apparatus control valve has been operated is fed to both the first channel switching valve and the second channel switching valve, and when detected that the ground work apparatus control valve has been operated, the pilot pressure is fed to the second channel switching valve. The first channel switching valve is switched from the merging position to the independent supply position by the pilot pressure established in the travel detection circuit due to the travel apparatus control valve being operated. The second channel switching valve, during a state of non-travel remains in the non-supply position without being switched to the supply position by the pilot pressure established due to the ground work apparatus control valve being operated. Furthermore, when the ground work apparatus is being used and the travel apparatus control valve has been operated, the second channel switching valve is switched to the supply position by the sum pilot pressure of the pilot pressure established due to the ground work apparatus control valve being operated and the pilot pressure established in the travel detection circuit due to the travel apparatus control valve being operated.

In this sort of hydraulic system, a phenomenon occurs that in a case where the travel apparatus control valve has been operated while the ground work apparatus is in use, when the first channel switching valve is switched before the second channel switching valve, for example, when a travel operation has been performed while a boom was being raised, supply of pressurized oil to a boom cylinder that allows the boom to be operated is temporarily interrupted, so boom operation is temporarily stopped. Therefore, it is necessary to adopt settings such that when the travel apparatus control valve has been operated while the ground work apparatus is in use, the second channel switching valve is switched at the same time as the first channel switching valve, or the second channel switching valve is switched before the first channel switching valve.

Also, in the above conventional hydraulic system, pressurized oil from the high volume first and second pumps passes through the first channel switching valve, so the diameter of a spool of the first channel switching valve is comparatively large relative to the second channel switching valve or the like in order to suppress loss of pressure. Also, the first channel is switched by the pilot pressure established in the travel detection circuit that is in communication with the discharge oil path of the fourth pump via the orifice, so in order to improve the response of switching of the first channel switching valve when the travel apparatus control valve has been operated, it is necessary to enlarge the diameter of the orifice for introduction of pressurized oil to the travel detection circuit (on the upstream side of the travel detection circuit), so that a large amount of pressurized oil is introduced to the travel detection circuit from the fourth pump.

When the diameter of the orifice for introduction of pressurized oil to the travel detection circuit is enlarged, the neutral pressure of the travel detection circuit (circuit pressure of the travel detection circuit in a state in which part of the travel detection circuit is not blocked) when at low temperature increases, and thus the first channel switching valve becomes sensitive. Also, when the neutral pressure of the travel detection circuit is high, there is less freedom for setting the switching pressure of the first channel switching valve.

On the other hand, when the second channel switching valve is switched to the supply position by the sum pilot pressure of the pilot pressure established due to the ground work apparatus control valve being operated and the pilot pressure established in the travel detection circuit due to the travel apparatus control valve being operated, and the ground work apparatus is being operated, the second channel switching valve cannot be switched to the supply position for various reasons even though the travel apparatus control valve is not being operated, so the switching pressure of the second channel switching valve cannot be set very low in order to eliminate such a circumstance from occurring (in order that the second channel switching valve is reliably switched to the supply position when the ground work apparatus control valve and the travel apparatus control valve have been operated).

Also, response will worsen if the switching pressure of the first channel switching valve is greatly increased, and in any event there is a limit to how much the switching pressure can be increased.

For the above reasons, in the circuit configuration of a conventional hydraulic system, when attempting to satisfy both improving the response of switching of the first channel switching valve when the travel apparatus control valve has been operated, and insuring reliability of switching of the second channel switching valve, it is difficult to adjust the switching pressure of the first channel switching valve and the second channel switching valve such that the second channel switching valve is switched at the same time as the first channel switching valve or before the first channel switching valve, and therefore there are instances when the first channel switching valve is switched before the second switching valve when the travel apparatus control valve has been operated while the ground work apparatus is in use.

SUMMARY OF THE INVENTION

It is an object of the present invention to provide a backhoe hydraulic system that can reliably prevent a phenomenon in which when a travel apparatus control valve has been operated while a ground work apparatus control valve is in use, supply of pressurized oil to a hydraulic cylinder or the like that allows the ground work apparatus to be operated is temporarily interrupted, so that operation of the ground work apparatus is temporarily stopped.

In order to attain the above object, the present invention is directed to a backhoe hydraulic system, comprising:

- a first pump and a second pump that supply pressurized oil to travel apparatus control valves and ground work apparatus control valves;
- a third pump that supplies pressurized oil to a swiveling base control valve;
- a fourth pump that supplies a pilot pressure;
- a travel detection circuit that is in communication with a discharge oil path of the fourth pump via a pressurized oil introduction orifice, and detects that the travel apparatus control valves have been operated;
- a first channel switching valve that is switchable between a merging position where pressurized oil from the first pump and the second pump merges together and is supplied to the ground work apparatus control valves, and an independent supply position where pressurized oil from the first pump and the second pump is respectively independently supplied to left and right travel apparatus control valves, wherein the first channel switching valve is switched to the merging position during a state of non-travel, and is switched to the independent supply position with pilot pressure when pressure has been established in the travel detection circuit by operation of the travel apparatus control valves;
- a second channel switching valve that is switchable between a non-supply position where pressurized oil from the third pump is not supplied to the ground work apparatus control valves, and a supply position where pressurized oil from the third pump is supplied to the ground work apparatus control valves, wherein the second channel switching valve is switched to the non-supply position during a state of non-travel, and is switched to the supply position with pilot pressure when pressure has been established in the travel detection circuit by operation of the travel apparatus control valves in a state in which the ground work apparatus control valves are being operated; and
- a pilot pressure control valve that is switchable between an operation position where pilot pressure is supplied to the first channel switching valve, and a non-operation position where pilot pressure is not supplied to the first channel switching valve, wherein the pilot pressure control valve is switched to the non-operation position during a state of non-travel, and is switched to the operation position with pilot pressure established in the travel detection circuit, and furthermore, in the operation position the pilot pressure control valve supplies pilot pressure to the first channel switching valve from the fourth pump on the upstream side of the pressurized oil introduction orifice.

In a more preferable embodiment, a pilot operation circuit is provided that is capable of supplying pilot pressure to the second channel switching valve such that the second channel switching valve is switched to the supply position when the travel apparatus control valves have been operated in a state in which the ground work apparatus control valves have been operated, and also, a channel switching operation valve that is switchable between a non-operation position where pilot pressure is not supplied to the second channel switching valve, and an operation position where pilot pressure is supplied to the second channel switching valve, is provided in the pilot operation circuit, and the channel switching operation valve is switched to the operation position with pilot pressure established in the travel detection circuit.

In the present invention, as with the conventional technology, the first channel switching valve is not directly switched to the independent supply position with pilot pressure established in the travel detection circuit when the travel apparatus control valve has been operated, rather, the pilot pressure control valve is switched to the operation position with the pilot pressure established in the travel detection circuit, so pilot pressure (source pressure) from the fourth pump on upstream side of the pressurized oil introduction orifice is supplied to the first channel switching valve via the pilot pressure control valve, and thus the first channel switching valve is switched to the independent supply position. As a result, even if the diameter of the pressurized oil introduction orifice is not large, the pilot pressure for switching the first channel switching valve to the independent supply position can be secured, and because the pressurized oil introduction orifice can have a small diameter, it is possible for the neutral pressure of the travel detection circuit to be low. Thus, the switching pressure of the pilot pressure control valve can be freely set, so settings can easily be adopted such that when the travel apparatus control valve has been operated while the ground work apparatus is in use, the second channel switching valve is switched at the same time as the first channel switching valve or before the first channel switching valve. As a result, it is possible to reliably prevent a phenomenon in which, for example, when travel operation is performed while the boom is being raised, supply of pressurized oil to a boom cylinder that allows the boom to operate is temporarily interrupted, so that boom operation temporarily stops. That is, it is possible to insure continuous operation of the ground work apparatus when the travel apparatus control valve has been operated while the ground work apparatus is in use.

Other features and advantages of the present invention will become clear from the following description of embodiments with reference to the drawings.

DETAILED DESCRIPTION OF PREFERRED EMBODIMENTS

The following is a description of embodiments of the present invention, with reference to the accompanying drawings.

Figure 1:
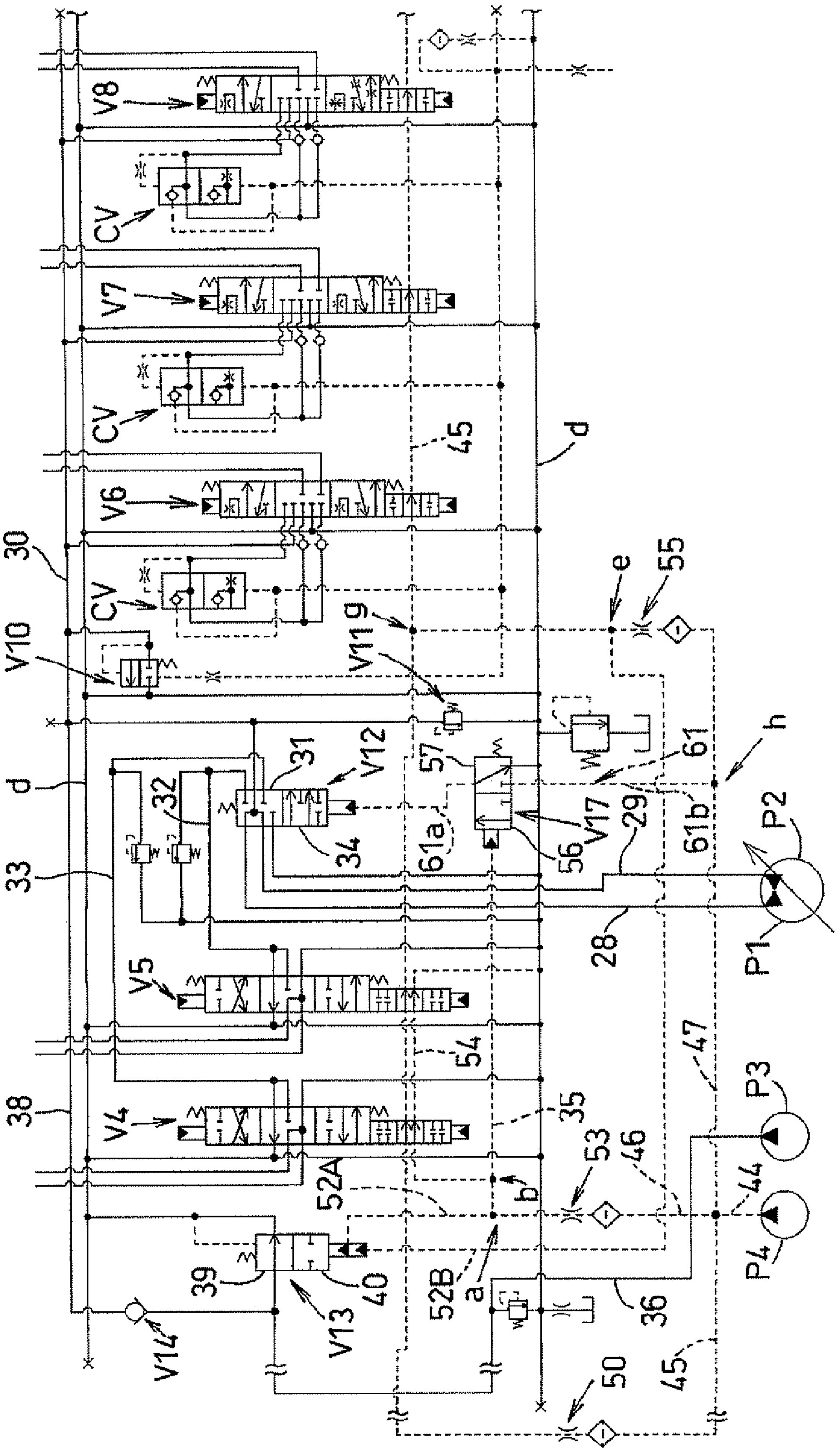
FIG. 1 is a hydraulic circuit diagram of an operating system of a first channel switching valve and a second channel switching valve.
Figure 2:
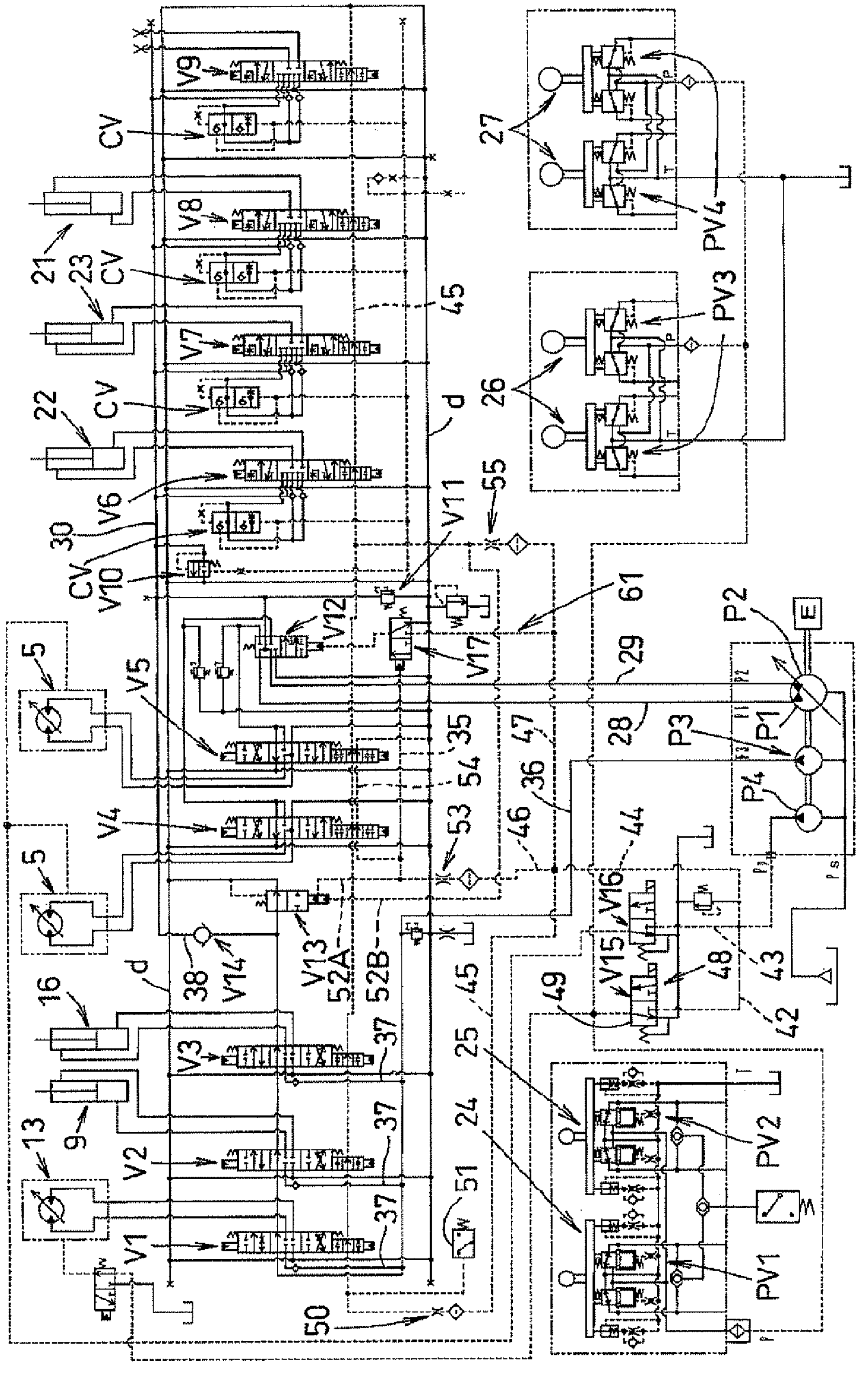
FIG. 2 is a hydraulic circuit diagram of an overall hydraulic system.
Figure 3:
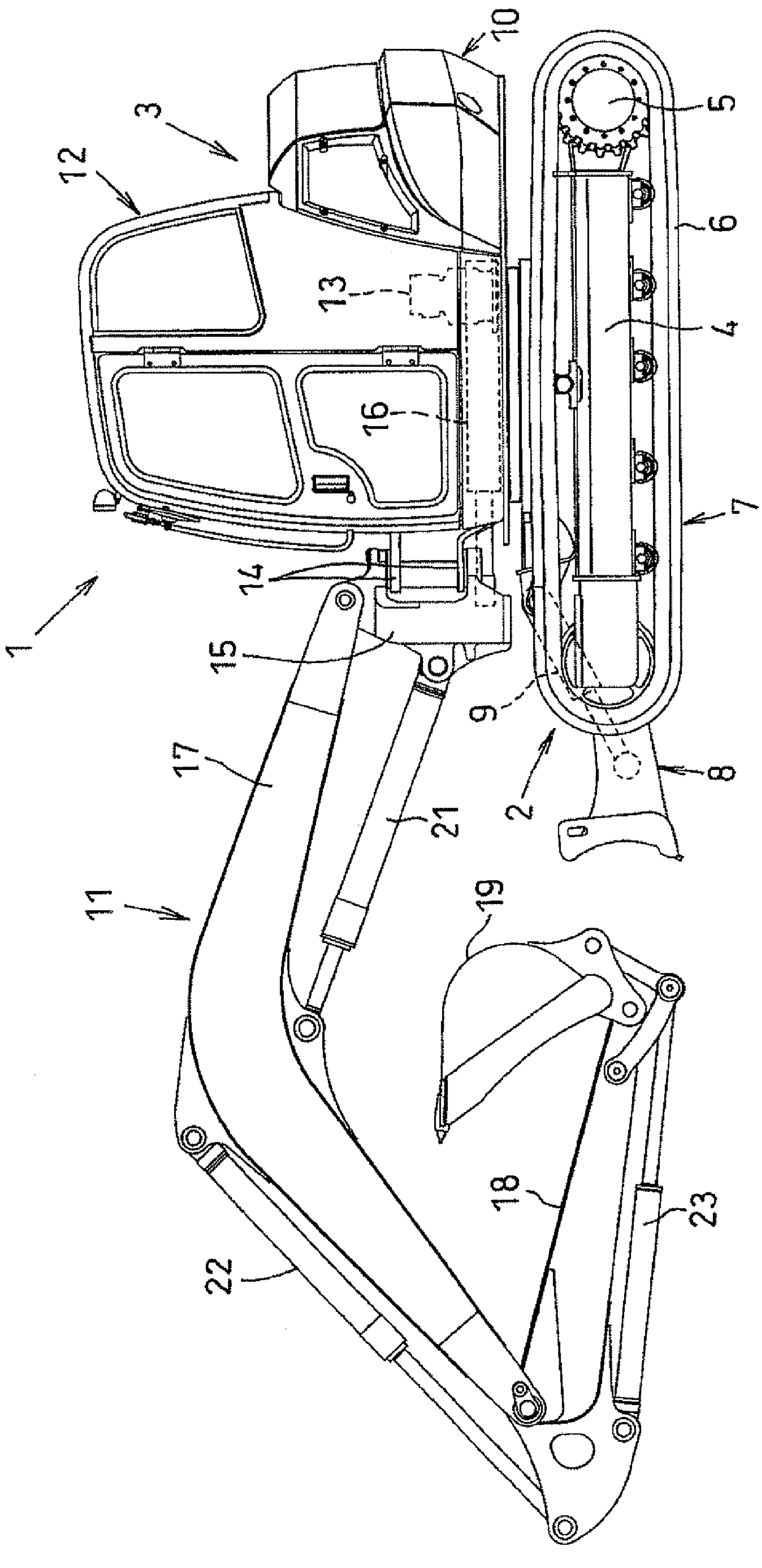
FIG. 3 is a side view of an entire backhoe.

FIG. 1 is a hydraulic circuit diagram that shows portions of a backhoe hydraulic system that are relevant to the present invention, FIG. 2 is a hydraulic circuit diagram of the overall backhoe hydraulic system, and FIG. 3 is a side view of a backhoe equipped with such a hydraulic system.

As shown in FIG. 3, a backhoe 1 is mainly configured from a bottom traveling body 2 and a top swiveling body 3 that is mounted on the traveling body 2 such that the entire swiveling body 3 can be swiveled around a swiveling axis in the vertical direction. The traveling body 2 is provided with a roller-type travel apparatus 7 on both the left and right sides of a track frame 4 configured so as to circulate a crawler belt 6 in the circumferential direction with a travel motor 5 comprised of a hydraulic motor.

A dozer apparatus 8 is provided at the front of the track frame 4, and a blade of this dozer apparatus is operated up or down by extension or contraction of a dozer cylinder 9 comprised of a hydraulic cylinder. The swiveling body 3 is provided with a swiveling base 10 mounted above the track frame 4 such that the swiveling base 10 can rotate around a swiveling axis, a ground work apparatus (excavation work apparatus) 11 provided at the front of the swiveling base 10, and a cabin 12 mounted on the swiveling base 10. The swiveling base 10 is provided with an engine, a radiator, a fuel tank, an operating oil tank, a battery, and the like, and the swiveling base 10 is driven to swivel by a swiveling motor 13 comprised of a hydraulic motor Also, a swing bracket 15 is provided at the front of the swiveling base 10, and is supported such that the swing bracket 15 can swing to the left or right around a vertical axis by a support bracket 14 provided protruding frontward from the swiveling base 10. The swing bracket 15 is operated to swing to the left or right by extension or contraction of a swing cylinder 16 comprised of a hydraulic cylinder. The ground work apparatus 11 is mainly configured from a boom 17 whose base side is pivotably linked to the top of the swing bracket 15 so as to be rotatable around a left-right axis so that the boom 17 can swing vertically, an arm 18 whose base side is pivotably linked to the front end side of the boom 17 so as to be rotatable around a left-right axis so that the arm 18 can swing to the front or rear, and a bucket 19 that is pivotably linked to the front end side of the arm 18 so as to be rotatable around a left-right axis so that the bucket 19 can swing to the front or rear.

The boom 17 is raised by extending a boom cylinder 21 provided between the boom 17 and the swing bracket 15, and is lowered by contracting the boom cylinder 21. A crowding operation (raking-in operation) of the arm 18 is performed by swinging the arm 18 to the rear by extending an arm cylinder 22 provided between the arm 18 and the boom 17, and a dumping operation of the arm 18 is performed by swinging the arm 18 to the front by contracting the arm cylinder 22. A crowding operation (scooping operation) of the bucket 19 is performed by swinging the bucket 19 to the rear by extending a bucket cylinder 23 provided between the bucket 19 and the arm 18, and a dumping operation of the bucket 19 is performed by swinging the bucket 19 to the front by contracting the bucket cylinder 23. The boom cylinder 21, the arm cylinder 22, and the bucket cylinder 23 are each configured with a hydraulic cylinder.

Next is a description of a hydraulic system for operating various hydraulic actuators provided in the backhoe 1, with reference to FIGS. 1 and 2.

In FIG. 2, V1 is a swiveling control valve that controls the swiveling motor 13, V2 is a dozer control valve that controls a dozer cylinder 9, V3 is a swinging control valve that controls a swinging cylinder 16, V4 is a left side travel control valve that controls the left side travel motor 5, V5 is a right side travel control valve that controls the right side travel motor 5, V6 is an arm control valve that controls the arm cylinder 22, V7 is a bucket control valve that controls the bucket cylinder 23, V8 is a boom control valve that controls the boom cylinder 21, and V9 is an SP control valve that controls a hydraulic attachment such as a hydraulic breaker or the like that is separately installed in the ground work apparatus 11.

These control valves V1 to V9 are configured from direct-acting spool-type switching valves, and are configured with pilot operation switching valves that are switched using pilot pressure. The control valves V1 to V9 are moved in proportion to an operating amount of respective operating means that operate each of the control valves V1 to V9, and supply an amount of pressurized oil proportional to the amount that the control valves V1 to V9 were moved to hydraulic actuators as control subjects. It is possible to change the operating speed of an operated valve in proportion to the operating amount of each operating means. The left side travel control valve V4 is switched using a left side travel pilot valve PV1 that is operated with a left side travel lever 24, and the right side travel control valve V5 is switched using a right side travel pilot valve PV2 that is operated with a right side travel lever 25. The travel levers 24 and 25 and the pilot valves PV1 and PV2 are disposed on the front side of a driver's seat inside the cabin 12.

The left and right travel levers 24 and 25 are provided such that they can be tilted to the front or rear, and the left and right travel control valves V4 and V5 are operated such that when the left and right travel levers 24 and 25 are tilted to the front, the travel motor 5 is driven such that the corresponding travel apparatus 7 drives forward, and when the left and right travel levers 24 and 25 are tilted to the rear, the travel motor 5 is driven such that the corresponding travel apparatus 7 drives rearward.

The swiveling control valve V1 and the arm control valve V6 are switched by a maneuvering pilot valve PV3 operated using one maneuvering lever 26, and the maneuvering lever 26 is disposed on the left side of the driver's seat.

Also, the bucket control valve V7 and the boom control valve V8 are switched by a maneuvering pilot valve PV4 operated using one maneuvering lever 27, and the maneuvering lever 27 is disposed on the right side of the driver's seat. The left and right maneuvering levers 26 and 27 are provided such that they can be tilted to the front, rear, left, or right. In this embodiment, when the left side maneuvering lever 26 is tilted to the left or right, the corresponding control valve V1 is operated such that the swiveling base 10 swivels to the left or right, and when the left side maneuvering lever 26 is tilted to the front or rear, the corresponding control valve V6 is operated such that the arm 18 performs a dumping operation or a crowding operation, and when the right side maneuvering lever 27 is tilted to the left or right, the corresponding control valve V7 is operated such that the bucket 19 performs a crowding or dumping operation, and when the right side maneuvering lever 27 is tilted to the front or rear, the corresponding control valve V8 is operated such that the boom 17 is lowered or raised.

The dozer control valve V2, the swinging control valve V3, and the SP control valve V9 are respectively operated by pilot valves operated by an unshown operating means. In this pressurized oil system, a pump that serves as a pressurized oil supply source is provided with a first pump P1, a second pump P2, a third pump P3, and a fourth pump P4, and these pumps P1, P2, P3, and P4 are driven by an engine E mounted in the swiveling base 10. The first pump P1 and the second pump P2 are swash plate-type variable capacity axial pumps, and are formed as a single unit with an equal flow rate double pump in which an equal discharge amount is obtained from two discharge ports, and the first pump P1 and the second pump P2 are used mainly for the travel motor 5 and hydraulic cylinders of the ground work apparatus 11.

The third pump P3 and the fourth pump P4 are configured with fixed capacity gear pumps, with the third pump P3 being mainly used for the swiveling motor 13, the dozer cylinder 9, and the swinging cylinder 16, and the fourth pump P4 being used for pilot pressure supply. The first pump P1 and the second pump P2 may also each be formed individually. In this hydraulic system, a load-sensing system is adopted in which by controlling the discharge amount of the first pump P1 and the second pump P2 according to the workload pressure of the boom 17, the arm 18, the bucket 19, and the like, and discharging the hydraulic power made necessary by the load from the first pump P1 and the second pump P2, it is possible to improve power economy and operability. This is an after-orifice load-sensing system in which pressure compensation valves CV are respectively connected after the main spools of the arm control valve V6, the bucket control valve V7, the boom control valve V8, and the SP control valve V9.

The control system circuit of this load-sensing system is not shown.

In the drawings, V10 is an unloading valve in the load-sensing system, and V11 is a system relief valve in the load-sensing system.

Also, the traveling section, swiveling section, dozer section, and swinging section are configured with open circuits.

In this hydraulic system, in a state of non-travel, the pressurized oil from the first pump P1 and the second pump P2 can merge together and be supplied to the control valves V8, V6, V7, and V9 for the boom 17, the arm 18, the bucket 19, and SP, and in a state of travel, the pressurized oil from the first pump P1 and the second pump P2 can be respectively independently supplied to the control valves V4 and V5 for the left and right travel apparatus 7, and the pressurized oil from the third pump P3 can be supplied to the control valves V8, V6, V7, and V9 for the boom 17, the arm 18, the bucket 19, and SP.

The pressurized oil circuit configuration that allows this operation will be described with reference to FIGS. 1 and 2.

A first channel switching valve V12, configured with a direct-acting spool-type pilot switching valve, is connected to the discharge circuits 28 and 29 of the first pump P1 and the second pump P2. The first channel switching valve V12 is switchable between a merging position 31 where the discharge circuit 28 of the first pump P2 and the discharge circuit 29 of the second pump P2 merge together and are connected to a work system supply circuit 30 that supplies pressurized oil to the control valves V8, V6, V7, and V9 for the boom 17, the arm 18, the bucket 19, and SP, and an independent supply position 34 where the discharge circuit 28 of the first pump P1 is connected to a travel right supply circuit 32 that supplies pressurized oil to the right side travel control valve V5 and the discharge circuit 29 of the second pump P2 is connected to a travel left supply circuit 33 that supplies pressurized oil to the left side travel control valve V4. The first channel switching valve V12 is switched to the merging position 31 with a spring, and is switched to the independent supply position 34 with a pilot pressure.

A pressurized oil supply path 37 that supplies pressurized oil to the swiveling control valve V1, the dozer control valve V2, and the swinging control valve V3 is connected to a discharge circuit 36 of the third pump P3, and the discharge circuit 36 is connected to a second channel switching valve V13, passing through the swiveling control valve V1, the dozer control valve V2, and the swinging control valve V3 in sequence. A connection circuit 38 is connected on the upstream side of the second channel switching valve V13 of the discharge circuit 36 of the third pump P3 and on the downstream side of the swinging control valve V3. The connection circuit 38 is connected to the work system supply circuit 30, and the discharge circuit 36 of the third pump P3 and the work system supply circuit 30 are connected by the connection circuit 38.

Also, a check valve V14 that prevents flow of pressurized oil from the work system supply circuit 30 side to the side of the discharge circuit of the third pump P3 is provided in the connection circuit 38. The second channel switching valve V13 is configured with a direct-acting spool-type pilot switching valve. The second channel switching valve V13 is switchable between a non-supply position 39 where pressurized oil from the third pump P3 is not supplied to the work system supply circuit 30 (the control valves V8, V6, V7, and V9 for the boom 17, the arm 18, the bucket 19, and SP) due to connecting the discharge circuit 36 of the third pump P3 to a drain circuit d, and a supply position 40 where discharged oil from the third pump P3 is supplied to the work system supply circuit 30 via the connection circuit 38 by blocking the connection between the discharge circuit 36 of the third pump P3 and the drain circuit d. The second channel switching valve V13 is switched to the non-supply position 39 with a spring, and is switched to the supply position 40 with a pilot pressure.

Pressurized oil discharged from the fourth pump P4 is shunted by first to third discharge circuits 42, 43, and 44. The first discharge circuit 42 is connected to an unload valve V15, the second discharge circuit 43 is connected to a travel two-speed switching valve V16, and the third discharge circuit 44 is branched to a valve operation detection circuit 45, a first pilot pressure supply circuit 46, and a second pilot pressure supply circuit 47. The unload valve V15 is configured with an electromagnetic valve (an electromagnetic switching valve), and is switchable between a supply position 48 where pressurized oil from the first discharge circuit 42 is supplied to the left and right travel pilot valves PV1 and PV2, the left and right maneuvering pilot valves PV3 and PV4, a pilot valve (not shown) that operates the dozer control valve V2, a pilot valve (not shown) that operates the swinging control valve V3, and a pilot valve (not shown) that operates the SP control valve V9, and a non-supply position 49 where pressurized oil is not supplied to these pilot valves due to draining the pressurized oil from the first discharge circuit 42. The unload valve V15 is switched to the non-supply position 49 with a spring, and is switched to the supply position 48 with an exciting signal.

Exciting/degaussing signals are emitted to the unload valve V15 by the raising/lowering operation of a lock lever disposed to the side of the driver's seat. By pulling up the lock lever when exiting from the backhoe 1, a degaussing signal is emitted to the unload valve V15 and thus the unload valve V15 is switched to the non-supply position 49, and by pushing the lock lever downward after entering the vehicle, an exciting signal is emitted and thus the unload valve V15 is switched to the supply position 48. The travel two-speed switching valve V16 is configured with a direct-acting spool-type electromagnetic valve, and due to being excited, is switched to a supply position in opposition to a spring, and thus pressurized oil from the second discharge circuit 43 is fed to the left and right travel motors 5. The left and right travel motors 5 are configured with swash plate-type variable capacity axial motors that can be shifted between two speeds, high and low, and by changing the angle of the of the swash plate, the travel motors 5 can be switched between the first speed and the second speed. With the pressurized oil from the second discharge circuit 43 that has been fed to a travel motor 5, the swash plate is switched and thus the travel motor 5 is switched from the first speed to the second speed.

The valve operation detection circuit 45 is connected to the drain circuit d via the orifice 50, the swiveling control valve V1, the dozer control valve V2, the swinging control valve V3, the left side travel control valve V4, the right side travel control valve V5, the arm control valve V6, the bucket control valve V7, the boom control valve V8, and the SP control valve V9. A pressure switch 51 is connected between the orifice 50 of the valve operation detection circuit 45 and the swiveling control valve V1, and by operating any of the control valves V1 to V9 from a neutral position, part of the valve control detection circuit 45 is blocked, and thus pressure is established in the valve operation detection circuit 45 and this pressure is detected with the pressure switch 51.

The number of revolutions of the engine E is automatically controlled such that when pressure is not detected with the pressure switch 51, the number of revolutions of the engine E is automatically reduced to idling rotation, and when pressure is detected with the pressure switch 51, the number of revolutions of the engine E is automatically increased to a predetermined number of revolutions.

The first pilot pressure supply circuit 46 is branched to a first channel switching circuit 52A and a pilot pressure switching circuit 35, and an orifice 53 for introducing pressurized oil is provided on the upstream side of this branch point a (connection point a where the first channel switching circuit 52A and the pilot pressure switching circuit 35 connect). The first channel switching circuit 52A is connected to a pilot port (spool end) of the second channel switching valve V13, a second channel switching circuit 52B is connected to the pilot port of the second channel switching valve V13, and the second pilot pressure supply circuit 47 is connected to the second channel switching circuit 52B.

Accordingly, the second channel switching valve V13 is switched to the supply position 39 by the sum pilot pressure of the pressure that is established in the first channel switching circuit 52A and the pressure that is established in the second channel switching circuit 52B.

The second pilot pressure supply circuit 47 is connected on the downstream side of the right side travel control valve V5 of the valve operation detection circuit 45 and on the upstream side of the arm control valve V6 at a connection point g. A pressurized oil introduction orifice 55 is provided in the second pilot pressure supply circuit 47, and between this orifice 55 and the connection point g, the second channel switching circuit 52B is connected at a connection point e. Also, one end of a travel detection circuit 54 is connected to the pilot pressure switching circuit 35 at a connection point b, and the other end of this travel detection circuit 54 is connected to the drain circuit d from the left side travel control valve V4 via the right side travel control valve V5.

Also, the pilot pressure switching circuit 35 is connected to a pilot port of a pilot pressure control valve V17. The pilot pressure control valve V17 is configured with a direct-acting spool-type pilot operation switching valve, and is switchable between an operation position 56 where pilot pressure is supplied to the first channel switching valve V12 and a non-operation position 57 where pilot pressure is not supplied to the first channel switching valve V12. The pilot pressure control valve V17 is provided in a pilot operation circuit 61 comprised of a first oil path 61*a* and a second oil path 61*b*. One end of the first oil path 61*a* is connected to the pilot pressure control valve V17, and the other end is connected to the pilot port of the first channel switching valve V12. One end of the second oil path 61*b* is connected to the pilot pressure control valve V17, and the other end is connected at a connection point h on the upstream side of the orifice 55 in the second pilot pressure supply circuit 47.

The pilot pressure control valve V17, in a state of non-travel, is switched to the non-operation position 57 with a spring, thus putting the first oil path 61*a* of the pilot operation circuit 61 in communication with the drain circuit d, and in a state of travel, is switched to the operation position 56 with the pilot pressure that is established in the travel detection circuit 54 and the pilot pressure switching circuit 35. In the operation position 56, pilot pressure from the fourth pump P4 on the upstream side of the pressurized oil introduction orifice 53 is supplied to the first channel switching valve V12.

According to this configuration, when the left and right travel control valves V4 and V5 are not being operated (when the left and right travel control valves V4 and V5 are in a neutral position (during a state of non-travel)), pressure is not established in the travel detection circuit 54, the pilot pressure switching circuit 35, and the first channel switching circuit 52A, so the pilot pressure control valve V17 is set to the non-operation position 57, the first channel switching valve V12 is set to the merging position 31, and the second channel switching valve V13 is set to the non-supply position 39. Thus, discharged oil from the first pump P1 and the second pump P2 merges together, so pressurized oil can be supplied to the control valves V6, V7, V8, and V9 for the arm 18, the bucket 19, the boom 17, and SP, and the pressurized oil from the third pump P3 is drained after passing through the swiveling control valve V1, the dozer control valve V2, and the swinging control valve V3.

In this state, when the control valves V6, V7, V8, and V9 for the arm 18, the bucket 19, the boom 17, and SP are operated from a neutral position, the valve operation detection circuit 45 is blocked on the downstream side from the connection point g of the valve operation detection circuit 45 and the second pilot pressure supply circuit 47, so pressurized oil from the second pilot pressure supply circuit 47 flows to the second channel switching circuit 52B, but because pressure is not established in the travel detection circuit 54 and the first channel switching circuit 52A, the second channel switching valve V13 remains switched to the non-supply position 39, and pressurized oil from the third pump P3 is not supplied to the control valves V6, V7, V8, and V9 for the arm 18, the bucket 19, the boom 17, and SP.

On the other hand, when the left and right travel control valves V4 and V5 are operated from a neutral position, a part of the travel detection circuit 54 is blocked, so pressure is established in the travel detection circuit 54 and in the pilot pressure switching circuit 35, and thus the pilot pressure control valve V17 is switched to the operation position 56 and a pilot source pressure from the fourth pump P4 on the upstream side of the pressurized oil introduction orifice 53 is supplied to the first channel switching valve V12, and therefore the first channel switching valve V12 is switched to the independent supply position 34. As a result, discharged oil from the first pump P1 is supplied to the right side travel control valve V5 and discharged oil from the second pump P2 is supplied to the left side travel control valve V4, and so the discharged oil from the first pump P1 and the second pump P2 is not supplied to the control valves for the arm 18, the bucket 19, the boom 17, and SP.

At this time, when the control valves V6, V7, V8, and V9 for the arm 18, the bucket 19, the boom 17, and SP are not being operated, pressure is not established in the second channel switching circuit 52B, so the second channel switching valve V13 is not switched to the supply position 40 (remains at the non-supply position 39). However, when the control valves V6, V7, V8, and V9 for the arm 18, the bucket 19, the boom 17, and SP are operated and thus the valve operation detection circuit 45 is blocked, pressure is established in the second channel switching circuit 52B, so the second channel switching valve V13 is switched to the supply position 40 by the sum pressure of the first channel switching circuit 52A and the second channel switching circuit 52B, and therefore pressurized oil from the third pump P3 can be supplied to the control valves V6, V7, V8, and V9 for the arm 18, the bucket 19, the boom 17, and SP.

Accordingly, in a state in which the control valves V6, V7, V8, and V9 for the arm 18, the bucket 19, the boom 17, and SP are being operated, for example, when one or both of the travel control valves V4 and V5 have been operated in a state in which the boom control valve V8 is being raised, pressure is established in the travel detection circuit 54 in a state in which pressure has been established in the second channel switching circuit 52B, so the second channel switching valve V13 is switched to the supply position 40, and thus, although supply of pressurized oil to the boom control valve V8 from the first and second pumps P1 and P2 is cut off, pressurized oil from the third pump P3 is supplied to the boom control valve V8, so operation of the boom 17 continues.

At this time, when the first channel switching valve V12 is switched before the second channel switching valve V13, the supply of pressurized oil to the boom control valve V8 is temporarily interrupted, so movement of the boom 17 is temporarily stopped. Therefore, in this embodiment, the switching pressures of the pilot pressure control valve V17 and the second channel switching valve V13 are set such that the second channel switching valve V13 is switched to the operation position 59 by a pilot pressure (switching pressure) with the same pressure as the pilot pressure control valve V17, or the second channel switching valve V13 is switched to the operation position 59 with a lower pilot pressure than the pilot pressure control valve V17. Thus, when the travel control valve V4 or V5 has been operated in a state in which the boom control valve V8 is being raised, continuity of the raising operation of the boom 17 is maintained, without temporarily interrupting operation of the boom 17.

This is also true for a case in which the travel control valve V4 or V5 has been operated in a state in which the boom control valve V8 is being lowered, or a in a state in which the control valve V6, V7, or V9 for the arm 18, the bucket 19, or SP is being operated.

Figure 4:
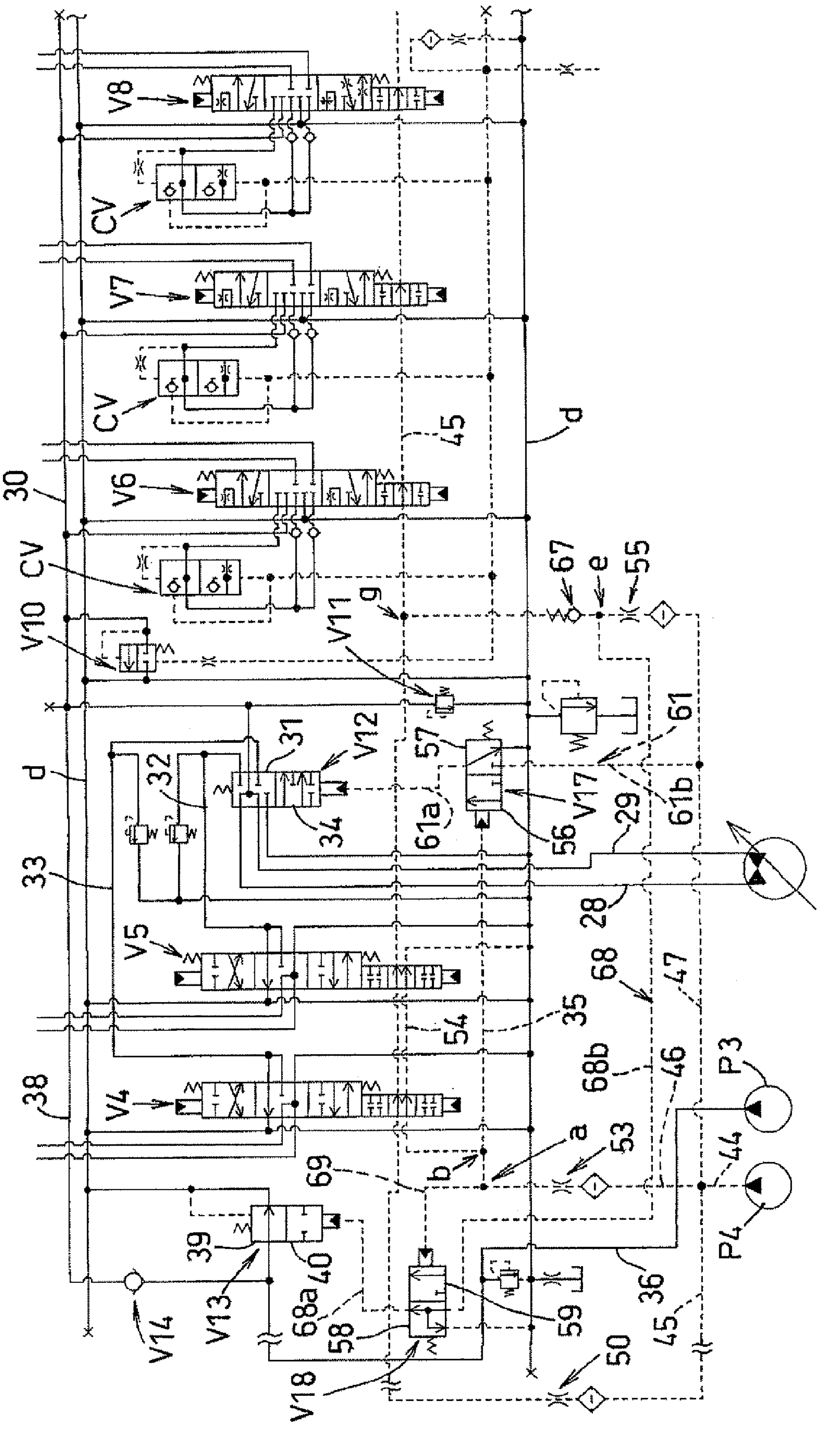
FIG. 4 is a hydraulic circuit diagram of an operating system of a first channel switching valve and a second channel switching valve according to another embodiment.

FIG. 4 shows another embodiment of a hydraulic system, and in this embodiment, mainly differing points are described, while omitting drawings and description of parts that are the same as in the above embodiment.

In the hydraulic system according to FIG. 4, a check valve 67 that prevents flow of pressurized oil from a valve operation detection circuit 45 side to an orifice 55 side is provided between a connection point g and an orifice 55 of a second pilot pressure supply circuit 47.

Also, one end of a pilot operation circuit 68 (referred to as a second pilot operation circuit 68) is connected between the orifice 55 and the check valve 67 of the second pilot pressure supply circuit 47, and the other end of the second pilot operation circuit 68 is connected to a pilot port of a second channel switching valve V13. Also, a channel switching operation valve V18 configured with a direct-acting spool-type pilot operation switching valve is provided in the second pilot operation circuit 68. The second pilot operation circuit 68 is comprised of a first oil path 68*a* and a second oil path 68*b*. One end of the first oil path 68*a* is connected to the pilot port of the second channel switching valve V13, and the other end is connected to the channel switching operation valve V18. One end of the second oil path 68*b* is connected to the channel switching operation valve V18, and the other end is connected to the second pilot pressure supply circuit 47 at a connection point e.

Also, an operation circuit 69 that is branched from a first pilot pressure supply circuit 46 at a branch point a on the downstream side from an orifice 53 is connected to the pilot port of the channel switching operation valve V18. Further, the channel switching operation valve V18 is switchable between a non-operation position 58 where pilot pressure is not supplied to the second channel switching valve V13 by causing the pressurized oil of the second pilot operation circuit to flow to a drain circuit d, and an operation position 59 where pilot pressure of the second pilot operation circuit 68 is supplied to the second channel switching valve V13. The channel switching operation valve V18 is switched to the non-operation position 58 with a spring, and is switched to the operation position 59 with pilot pressure established in the operation circuit 68.

In the hydraulic system shown in FIG. 4, when the left and right travel control valves V4 and V5 are not being operated, pressure is not established in the travel detection circuit 54, the pilot pressure switching circuit 35, and the operation circuit 69. Thus, the pilot pressure control valve V17 is set to the non-operation position 57 so the first channel switching valve V12 is set to the merging position 31, and the channel switching operation valve V18 is set to the non-operation position 58 so the second channel switching valve V13 is set to the non-operation position 39. Accordingly, discharged oil from the first pump P1 and the second pump P2 merges together, so pressurized oil can be supplied to the control valves V6, V7, V8, and V9 for the arm 18, the bucket 19, the boom 17, and SP, and pressured oil from the third pump P3 is drained after passing through the swiveling control valve V1, the dozer control valve V2, and the swinging control valve V3.

In this state, when the control valves V6, V7, V8, and V9 for the arm 18, the bucket 19, the boom 17, and SP are operated from a neutral position, the valve operation detection circuit 45 is blocked on the downstream side from the connection point g of the valve operation detection circuit 45 and the second pilot pressure supply circuit 47, so pressurized oil from the second pilot pressure supply circuit 47 flows to the second pilot operation circuit 68. However, because the channel switching operation valve V18 is set to the non-operation position 58, the pressurized oil that flows to the second pilot operation circuit 68 is caused to flow to the drain circuit d. Thus, pilot pressure is not established at the spool end of the second channel switching valve V13, so the second channel switching valve V13 remains set at the non-supply position 39, and therefore pressurized oil from the third pump P3 is not supplied to the control valves V6, V7, V8, and V9 for the arm 18, the bucket 19, the boom 17, and SP.

On the other hand, when the left and right travel control valves V4 and V5 are operated from a neutral position, a part of the travel detection circuit 54 is blocked, so pressure is established in the travel detection circuit 54, the pilot pressure switching circuit 35, and the operation circuit 69, and thus the pilot pressure control valve V17 is switched to the operation position 56 so the first channel switching valve V12 is switched to the independent supply position 34, and the channel switching operation valve V18 is switched to the operation position 59. When the first channel switching valve V12 is switched to the independent supply position 34, discharged oil from the first pump P1 is supplied to the right side travel control valve V5, and discharged oil from the second pump P2 is supplied to the left side travel control valve V4, so discharged oil from the first and second pumps P1 and P2 is not supplied to the control valves for the arm 18, the bucket 19, the boom 17, and SP.

At this time, when the control valves V6, V7, V8, and V9 for the arm 18, the bucket 19, the boom 17, and SP are not being operated, although the channel switching operation valve V18 is switched to the operation position 59, pressurized oil from the second pilot pressure supply circuit 47 flows to the drain circuit d via the valve operation detection circuit 45 from the check valve 67, so the second channel switching valve V13 is not switched to the supply position 40 (remains at the non-supply position 39). However, when the control valves V6, V7, V8, and V9 for the arm 18, the bucket 19, the boom 17, and SP are operated and thus the valve operation detection circuit 45 is blocked, because the channel switching operation valve V18 is switched to the operation position 59, pressure is established in the second pilot operation circuit 68, and with this pressure, the second channel switching valve V13 is switched to the supply position 40, and therefore pressurized oil from the third pump P3 can be supplied to the control valves V6, V7, V8, and V9 for the arm 18, the bucket 19, the boom 17, and SP.

In a state in which the control valves V6, V7, V8, and V9 for the arm 18, the bucket 19, the boom 17, and SP are being operated, for example, when one or both of the travel control valves V4 and V5 have been operated in a state in which the boom control valve V8 is being raised, in a state in which pressure has been established in the second pilot operation circuit 68, the first channel switching valve V12 is switched to the independent supply position 34 and the channel switching operation valve V18 is switched to the operation position 59. Thus, although the second channel switching valve V13 is switched to the supply position 40, so supply of pressurized oil to the boom control valve V8 from the first and second pumps P1 and P2 is cut off, pressurized oil from the third pump P3 is supplied to the boom control valve V8, so operation of the boom 17 continues.

At this time, when the pilot pressure control valve V17 is switched before the channel switching operation valve V18, the supply of pressurized oil to the boom control valve V8 is temporarily interrupted, so movement of the boom 17 is temporarily stopped. Therefore, in this embodiment shown in FIG. 4, the switching pressures of the pilot pressure control valve V17 and the channel switching operation valve V18 are set such that the channel switching operation valve V18 is switched to the operation position 59 with a pilot pressure with the same pressure as the pilot pressure control valve V17, or the channel switching operation valve V18 is switched to the operation position 59 with a lower pilot pressure than the pilot pressure control valve V17. Thus, when the travel control valve V4 or V5 has been operated in a state in which the boom control valve V8 is being raised, continuity of the raising operation of the boom 17 is maintained, without temporarily interrupting operation of the boom 17.

In the embodiment shown in FIG. 4, the second channel switching valve V13 is not switched to the supply position 39 by the sum pilot pressure of the pressure that is established in the first channel switching circuit 52A and the pressure that is established in the second channel switching circuit 52B, as in the previous embodiment, and pilot pressure is supplied to the second channel switching valve V13 by switching of the channel switching operation valve V18, so the switching pressure of the channel switching operation valve V18, whose switching pressure can be freely set, may be set the same as the pilot pressure control valve V17 or lower than the pilot pressure control valve V17, so settings can easily be adopted such that when the travel control valve V4 or V5 has been operated while the ground work apparatus 11 is in use, the second channel switching valve V13 is switched at the same time as the first channel switching valve V12 or before the first channel switching valve V12.

What is claimed is:

1. A backhoe hydraulic system comprising:

a first pump and a second pump that supply pressurized oil to travel apparatus control valves and ground work apparatus control valves;

a third pump that supplies pressurized oil to a swiveling base control valve;

a fourth pump that supplies a pilot pressure;

a travel detection circuit that is in communication with a discharge oil path of the fourth pump via a pressurized oil introduction orifice, and detects that the travel apparatus control valves have been operated;

a first channel switching valve that is switchable between a merging position where pressurized oil from the first pump and the second pump merges together and is supplied to the ground work apparatus control valves, and an independent supply position where pressurized oil from the first pump and the second pump is respectively independently supplied to left and right travel apparatus control valves, wherein the first channel switching valve is switched to the merging position during a state of non-travel, and is switched to the independent supply position with pilot pressure when pressure has been established in the travel detection circuit by operation of the travel apparatus control valves;

a second channel switching valve that is switchable between a non-supply position where pressurized oil from the third pump is not supplied to the ground work apparatus control valves, and a supply position where pressurized oil from the third pump is supplied to the ground work apparatus control valves, wherein the second channel switching valve is switched to the non-supply position during a state of non-travel, and is switched to the supply position with pilot pressure when pressure has been established in the travel detection circuit by operation of the travel apparatus control valves in a state in which the ground work apparatus control valves are being operated; and a pilot pressure control valve that is switchable between an operation position where pilot pressure is supplied to the first channel switching valve, and a non-operation position where pilot pressure is not supplied to the first channel switching valve, wherein the pilot pressure control valve is switched to the non-operation position during a state of non-travel, and is switched to the operation position with pilot pressure established in the travel detection circuit, and furthermore, in the operation position the pilot pressure control valve supplies pilot pressure to the first channel switching valve from the fourth pump on the upstream side of the pressurized oil introduction orifice.

2. The backhoe hydraulic system according to claim 1, further comprising:

a pilot operation circuit that is capable of supplying pilot pressure to the second channel switching valve such that the second channel switching valve is switched to the supply position when the travel apparatus control valves have been operated in a state in which the ground work apparatus control valves have been operated;

wherein a channel switching operation valve that is switchable between a non-operation position where pilot pressure is not supplied to the second channel switching valve, and an operation position where pilot pressure is supplied to the second channel switching valve, is provided in the pilot operation circuit, and the channel switching operation valve is switched to the operation position with pilot pressure established in the travel detection circuit.

* * * * *